(No Model.) 3 Sheets—Sheet 1.

S. C. KENAGA.
CORN HARVESTER.

No. 299,401. Patented May 27, 1884.

Witnesses.
Jno. W. Stockett
C. C. Poole

Inventor.
Samuel C. Kenaga
per M. E. Dayton
Attorney

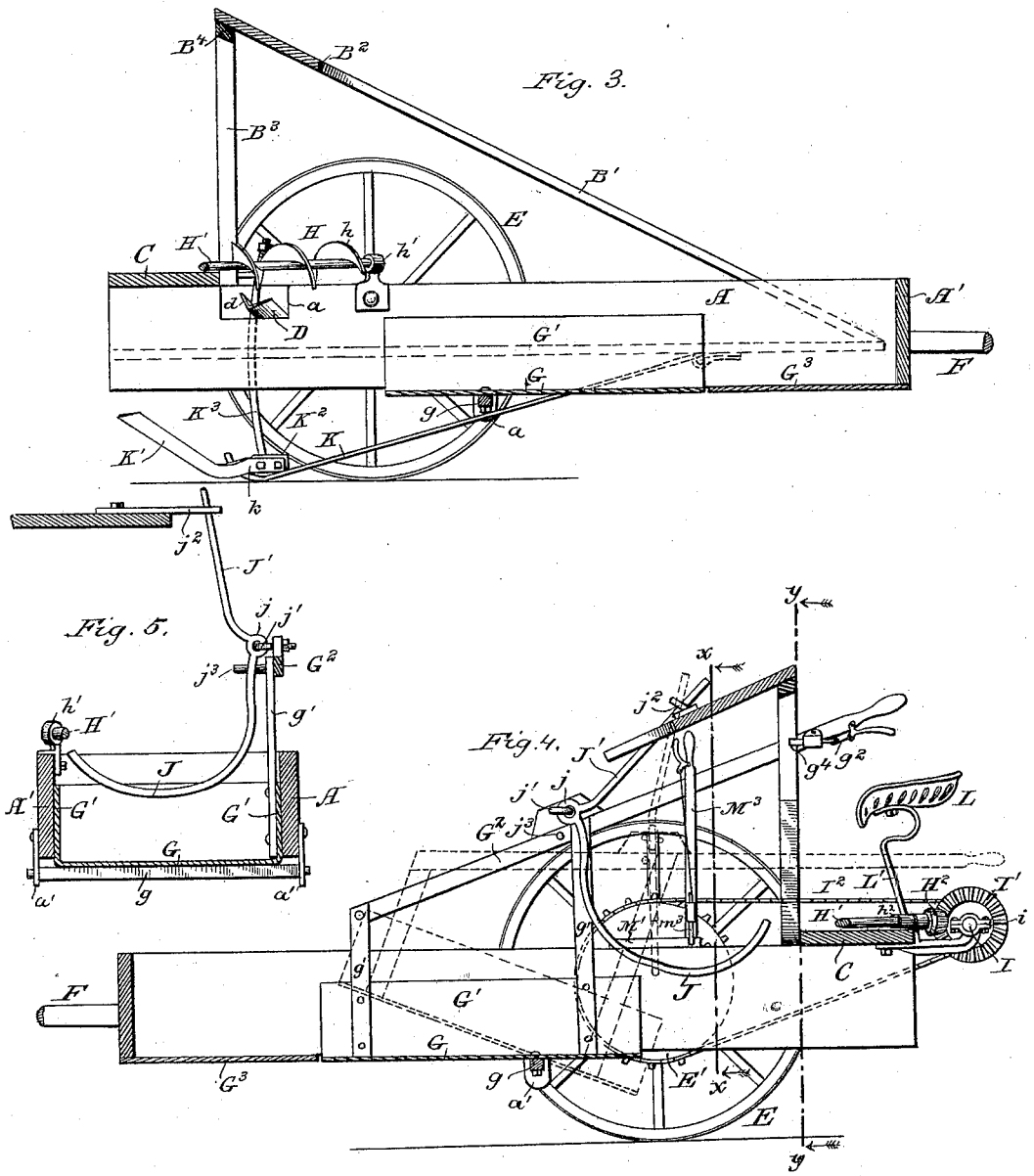

(No Model.)

S. C. KENAGA.
CORN HARVESTER.

No. 299,401. Patented May 27, 1884.

Witnesses:
Jno. W. Stockett
C. C. Poole

Inventor:
Samuel C. Kenaga
per W. E. Dayton
Attorney

UNITED STATES PATENT OFFICE.

SAMUEL C. KENAGA, OF KANKAKEE, ILLINOIS.

CORN-HARVESTER.

SPECIFICATION forming part of Letters Patent No. 299,401, dated May 27, 1884.

Application filed July 2, 1883. (No model.)

*To all whom it may concern:*

Be it known that I, SAMUEL C. KENAGA, of Kankakee, in the county of Kankakee and State of Illinois, have invented certain new and useful Improvements in Corn-Harvesters; and I do hereby declare that the following is a full, clear, and exact description thereof, reference being had to the accompanying drawings, and to the letters of reference marked thereon, which form a part of this specification.

This invention relates to an improvement in corn-harvesters or machines for cutting standing corn in the field and depositing it in bunches preparatory to shocking it. It relates more particularly to machines having stationary cutters or knives arranged to sever the cornstalks by being drawn against them in the forward movement of the machine. Its object is to generally improve the construction of the class of corn-harvesters referred to; and it consists in the matters hereinafter described, and pointed out in the claims. It has been found desirable in corn-harvesters of the class mentioned to arrange the cutting-knife at some considerable distance above the ground, so as to sever the corn at some distance above the roots, and thereby save the handling and storage of the lower part or butt-ends of the stalks, which is necessary when the stalks are cut at a point near the ground. In the use of machines so constructed stubs of considerable height are left in the field, which it is desirable to cut down, so that they may lie upon the soil and become rotted.

For the purpose of removing such stubs, one part of my invention consists in attaching to the corn-harvester a second cutting-knife constructed to travel a short distance above the ground, so as to encounter the standing butts and sever them at a point near their roots.

The invention consists also in improvements in machines having a receptacle for the cut corn adjacent to the knife, in the devices for delivering the cut corn into the receptacle and discharging it therefrom, in the construction and arrangement of the cutter-knife, and in improvements in other details of such machines, as will be hereinafter set forth.

Figure 1:
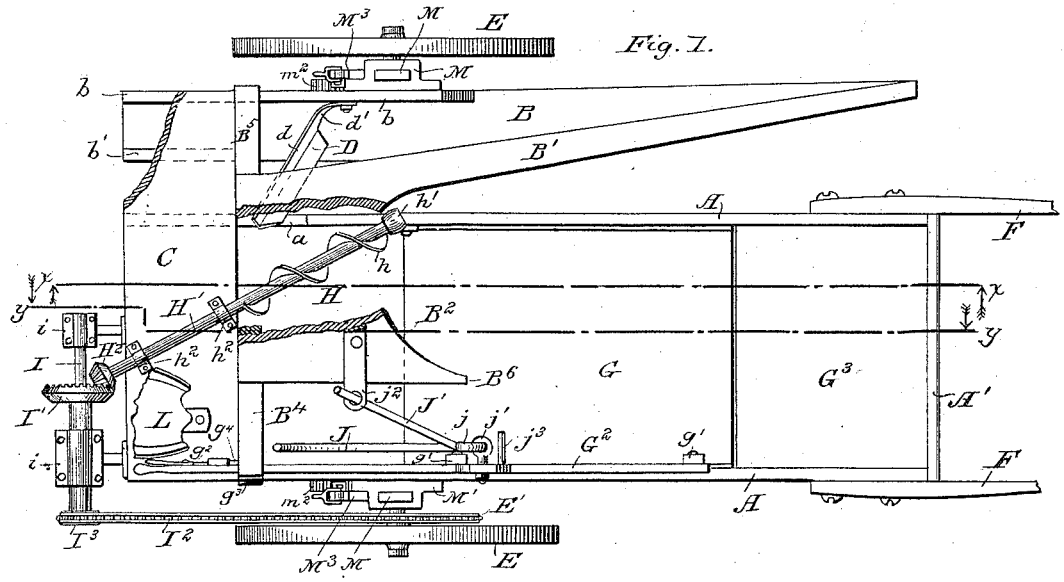
Figure 2:
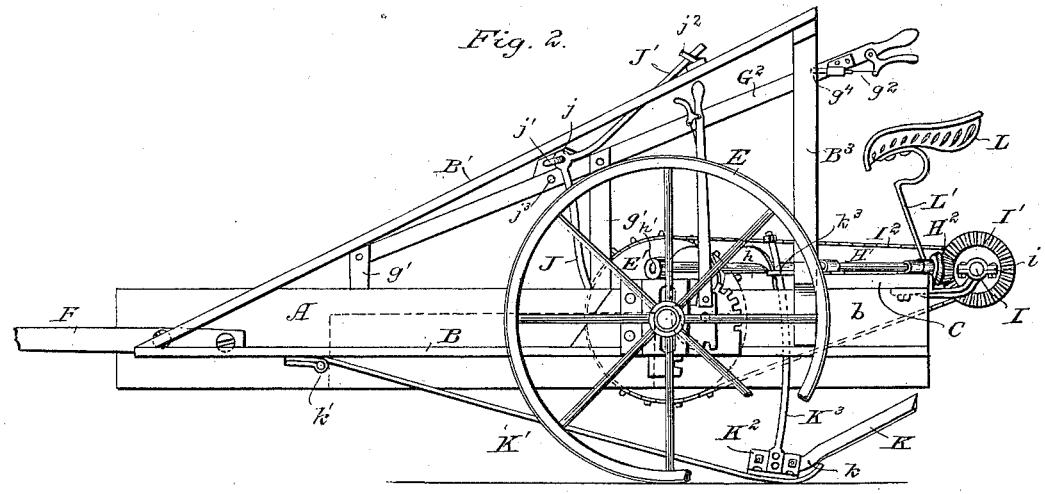
Figure 3:
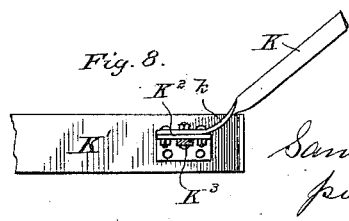
Figure 6:
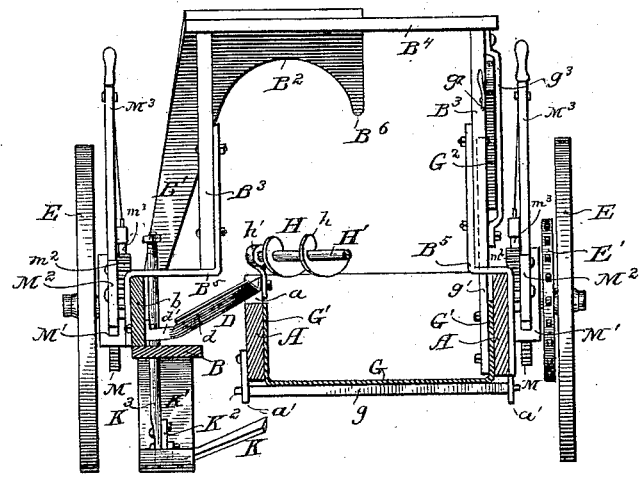
Figure 7:
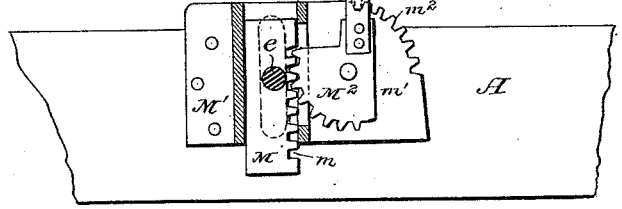

In the accompanying drawings, Figure 1 is a plan view of a corn-harvester embodying my invention. Fig. 2 is a side view of the same. Fig. 3 is a vertical longitudinal section upon line $x\ x$ of Fig. 1. Fig. 4 is a vertical longitudinal section upon line $y\ y$ of Fig. 1. Fig. 5 is a detail view of the device for temporarily supporting the butts of the cut corn, taken upon line $x\ x$ of Fig. 4. Fig. 6 is a transverse vertical section upon line $y\ y$ of Fig. 4. Fig. 7 is a detail view of the device for adjusting the height of the body of the harvester upon the supporting-wheels. Fig. 8 is a detail plan view of the support for the lower knife.

The machine as illustrated in the drawings is organized to cut one row of corn at a time; and it consists, generally, of a receptacle for the corn having attached to it upon one side a guide-piece, which passes outside of the row of corn to be cut, between which guide-piece and the main frame the cutting-knife is placed.

The machine is supported at its rear end by two wheels placed at either side thereof, and two thills are attached to its front end, by which the machine is drawn either by one horse in the thills or by two horses traveling tandem.

The main frame or body of the machine consists of two longitudinal frame-pieces, A A, and an end piece, A', and upon one side of and parallel with the said main frame is placed a guide-piece, B, the pieces A' and B being connected to the frame-pieces A at the rear end of the machine by means of a cross-piece, C.

Between the guide-piece B and the frame-piece A, at one side of the machine, is placed a cutting-knife, D, which is inwardly, upwardly, and backwardly inclined, and is adapted to sever the cornstalks at a suitable distance from the ground as the machine is drawn forward. The guide-piece B is arranged to run outside of the row of corn which is being cut, and is provided with an upwardly and inwardly inclined guide, B', constructed to bend the cornstalks inwardly toward the frame of the machine as it is moved forward. The rear portion of the machine is supported by wheels E, placed at the side of the frame and vertically-adjustable thereon, and at its front end by means of thills F F, attached to the frame-pieces A.

Between and at the lower edges of the side frame-pieces, A A, is placed a platform, G, which, in connection with the said side pieces, forms a receptacle to receive the cut corn, and is pivoted between its ends, so that it may be tilted and the accumulated corn discharged, as hereinafter described. The upward and inwardly inclined guide B' terminates at its upper end in a curved portion, B², which is located in advance of the knife, and is arranged to strike the tops of the cornstalks which have been deflected inwardly by the guide B' and incline them forwardly, so that the knife will more readily sever them, and in position to fall into the adjacent receptacle after being cut. The upper end of the guide-piece B' and the curved deflector B² are supported in the machine shown by means of a cross-piece, B⁴, attached to the tops of two standards, B³, which are secured to the longitudinal frame-piece A at one side of the machine, and to the guide-piece B at the other side, by means of inwardly-bent bars B⁵, Fig. 6. The deflector B² is preferably provided with a forwardly-projecting portion, B⁶, which acts to arrest the lateral movement of the tops of the corn when thrown inwardly by the guide B² and to direct them forward upon the platform G.

As a preferable construction in the guide-piece B, it consists of a plank placed with its flat side horizontal, and connected to the cross-piece C at the rear end of the machine by two longitudinally-arranged pieces, $b$ and $b'$, placed on edge, and attached to the outer and inner edges, respectively, of the piece B and to the under side of the said cross-piece. The knife D is provided with an upwardly-projecting back piece or flange, $d$, which operates to support the butts of cut corn in a well-known manner.

It has been found in practice that in the use of a rearwardly-inclined knife as heretofore constructed the stalks yield laterally as they strike the inclined edge of the knife and move along the said edge, a draw-cut being thereby produced. At the inner end of the knife, at the point where it intersects the guide-piece, however, the stalks are held from lateral motion by the said guide-piece, so that they are liable to be caught in the acute angle formed by the knife and guide-piece, and the knife is at such time liable to become choked so as to fail to cut properly. To obviate this difficulty, I have supported the said knife upon the machine by a spring-connection, so that it will yield backwardly and have extended its inner end to a point beyond or inside of the outer face of the frame-piece A, so that in case any of the stalks become wedged in the angle between the knife and said guide-piece it will act with a draw-cut upon such stalks, and they will be readily severed.

As shown in the drawings, and as preferably constructed, the knife D is attached at its outer end to the guide-piece B by means of a spring, $d'$, and its inner end is unsupported and extends past the outer face of the frame-piece A, which is shown as cut away at $a$, to allow a free movement to the end of said knife.

By constructing the knife as shown, a cheap and simple means of supporting it is provided, and its greatest movement when pressed backward takes place at its inner end, and at the point at which such movement is most necessary.

The particular construction shown in the spring $d'$ is not a part of my invention, and is therefore not included in the matters claimed in this application.

In the operation of the machine, the corn is first inclined forwardly and inwardly by the guides B' and B², so that when it is cut the tops will fall forward upon the tilting platform G. In order to deliver the butts of the cut corn inwardly over the longitudinal side piece, A, when their tops are thrown forward, as described, a rotating spiral conveyer (designated, as a whole, by the letter H) is mounted upon the machine-frame in such position that the butt-ends of the corn will rest across it when the tops thereof fall forward, so that the butts will be carried thereby laterally inward and over the said side piece. The spiral conveyer mentioned is preferably placed in a horizontal position with its front end at a point over the guide-piece A, and in advance of the knife, and is arranged in a diagonal or rearwardly-inclined position, so that the butts will be carried to a point about midway of the machine, and will then be released from the said conveyer. As shown in the drawings, the conveyer H is composed of a shaft, H', having a spiral flange, $h$, upon its forward portion, and mounted at its front end in a bearing, $h'$, secured to the top of the frame-piece A at a point some distance in advance of the knife, and at its rear end in bearings $h^2$ $h^2$ upon the rear cross-piece, C. The said shaft is rotated in the machine shown by means of a pinion, H², upon its rear end, which meshes with a gear-wheel, I', upon a transverse shaft, I, having bearings in brackets $i$ upon the rear of the machine, and is driven by a belt, I², passing over sprocket-wheels I³ and E', secured upon said shaft and the wheel E, respectively. In the operation of the device last mentioned the butts of the cut corn, as the tops fall forward on being cut, rest across the forward end of the shaft H', and by the rotation thereof are carried by the rib $h$ inwardly, until, on account of the rearward inclination of the shaft H', they are no longer supported thereby, and fall to the receptacle G.

As an improved construction in the devices for discharging the accumulated corn from the machine, the receptacle or platform G is pivoted to the longitudinal frame-piece A at a point between its ends, whereby its rear end may be thrown downward and its front end elevated, so that the cut corn will slide therefrom to the ground. The said receptacle G is in the machine shown supported by a cross-bar, $g$, the ends of which have bearings in depending lugs $a'$ upon the side piece, A, said cross-bar being preferably placed nearer the rear than the front end of the receptacle, as shown in Figs. 3 and 4, so that when the said receptacle is tilted sufficiently to effect the discharge of the corn the rear end will not encounter the ground. The receptacle G is preferably provided with upwardly-projecting side flanges, G', and is moved by means of a rearwardly-projecting hand-lever, G², connected thereto by means of uprights g', attached to one of the side flanges, G'. The end of said hand-lever is preferably placed outside of and adjacent to the standard B³, and a strip, g³, is attached to the side of said standard, so as to form a vertical guide-slot for said lever.

For the purpose of supporting the receptacle G in a horizontal position, the lever G² may be provided with a spring-detent, g², constructed to engage a notch, g⁴, in the standard B³; or any other well-known locking device may be used for the same purpose. The movable or tilting receptable G preferably terminates at its rear end at a point some distance in advance of the knife, and in such position that the butt-ends of the cut stalks, when they fall thereon, will project over said end, so that when the receptacle is tilted the overhanging ends of the stalks will encounter the ground, and by the forward movement of the machine the stalks will be dragged from the receptacle. The front end of said receptacle terminates in the machine shown at a short distance from the front cross-piece, A', a stationary bottom, G³, being secured to the front portion of the frame for the purpose of preventing the tops of the stalks which may project forward of said receptacle from dragging upon the ground. The receptacle G may manifestly be extended to the front cross-piece, A'; but the construction shown is preferred, inasmuch as a sufficient portion of the cut corn will rest thereon, to enable it to be thrown into an inclined position, and by reducing the length of said receptacle it is thereby made lighter and may be more easily operated.

For the purpose of supporting the butt-ends of the cornstalks which are delivered over the side piece, A, during the time that the receptacle G is being tilted for the purpose of discharging the accumulated corn therefrom, a swinging arm or rest, J, is connected to and operated by the lever G² in such manner that when the said lever is depressed for the purpose of tilting the said receptacle, the arm will be thrown across the machine and in position to receive the butts of the corn carried inwardly by the conveyer H, and will be moved backwardly and outwardly into a position against the longitudinal side piece, A, when the said receptacle is returned to its normal position.

As preferably constructed, the arm J is connected with an eye, j', upon the lever G² by means of an eye, j, and is provided with an upwardly-inclined arm, J', constructed to engage an eye, j², secured to the guide-piece B², the eyes j' and j² being relatively so situated that when the lever G² is depressed the arm J will be supported in a position transverse to the longitudinal side pieces of the machine, as shown in Fig. 5, and in dotted lines in Fig. 4, and when the said end is elevated the said arm will rest at the side of the corn-receptacle with its end toward the rear of the machine, as shown in Figs. 1 and 4. The arm J is preferably curved upwardly near its extremity, and is so located that its curved end will come beneath the forward portion of the conveyer H when thrown across the receptacle. A pin or stop, j³, may be placed upon the lever G² in position to encounter the vertical portion of the arm J, and to act as a positive stop to limit its forward movement. Such stop is not essential to the operation of the device, but is found desirable in practice for the reason that the said arm is preferably connected loosely to the eyes j' and j², and excessive play in said arm consequent in such loose connections is thereby prevented.

The eye j, instead of being placed upon the lever G², may manifestly be secured to any part which is attached to said lever or to the receptacle G. The eye j² also may be secured to any stationary part of the machine-frame or to an arm thereon.

The location of both the eyes mentioned may obviously be varied and the proper movement of the arm J at the same time retained, provided the direction and position of the arm J' are correspondingly changed.

By the construction described the arm J is thrown automatically into position to arrest the falling corn by the operation of tilting the receptacle G, and such corn is prevented from falling upon the receptacle until said receptacle has been returned to its normal position, thereby preventing the corn which is being cut during the time that the receptacle is being emptied from falling to the ground and being distributed along in the path of the machine.

Instead of supporting the arm J, as shown, a universal joint may be used in place of the eyes j and j', and the end of the arm J' held by a closely-fitted sliding connection instead of by the eye j², and a more perfect movement of the arm J would thereby be obtained. The construction described is found, however, to give a sufficiently accurate motion for the purpose, and a great advantage is gained on account of its simplicity and cheapness.

In the use of corn-harvesters it has been found desirable to locate the cutter at some distance above the ground, in order to deliver the cut tops properly into the receptacle, and so that the hard and innutritious portion of the stalks near the root will not be gathered up and housed. This location of the knife results in leaving corn-stubs of considerable height, and in order to remove such standing stubs an additional or second knife, K, is placed upon the machine at a point below and to the rear of the knife D. The knife K is preferably attached to a vertically-yielding support constructed to rest upon and follow the irregularities of the ground, so that the stubs will be severed in every case at a point near the ground. As preferably constructed, the said knife is connected at one end to the said support by a spring, and is placed in an upwardly and backwardly inclined position in the manner described in connection with the knife D.

As a preferable means of supporting the knife K, an inclined supporting-piece, K', is connected by a hinged joint, k', to the guide-piece B at a point near the front end of the latter, and the rear end of the strip is curved upwardly, so as to form a shoe arranged to rest upon the ground, as shown, an upwardly-projecting plate, K², being preferably riveted to the lower end of the strip, to which the spring-extension k of the knife is bolted, as shown in Fig. 8.

For the purpose of preventing lateral or side motion in the lower end of the support K, a rod, K³, is attached to the plate K², and extends upwardly through guide-apertures in the guide-piece B, and in a plate, k³, secured to the piece C, the said rod being curved in an arc concentric with the joint k', as shown, so that it will move freely in the said apertures when the lower end of the strip K' is moved vertically. A nut, k⁴, is preferably placed upon the screw-threaded upper end of the rod K³, and is adjustable thereon, so that the downward movement of the said strip may be limited when desired.

The support for the knife K, instead of being attached to the guide-piece B, may obviously be attached to the main frame of the machine and the knife inclined inwardly.

The particular device shown for supporting the said knife is not essential to my invention, and a vertically-yielding shoe of any desired or preferred construction arranged to rest upon the ground may be used.

A seat, L, for the driver is provided, which is preferably supported upon the cross-piece C by means of a spring-standard, L', as shown.

For the purpose of adjusting the frame or body of the machine vertically, the supporting-wheels E are mounted upon short axles e, secured in vertically-sliding plates M, which are held in guide-plates M', attached to the longitudinal frame-piece A upon one side of the machine, and to the longitudinal guide-piece B at the opposite side thereof.

For the purpose of supporting and adjusting the sliding plate M in the guide-plate M', a rack, m, is formed upon one edge of said plate, as shown in Fig. 7, and a segmental gear, M², is pivoted to a lateral extension, m', of the plate M', said segmental gear being operated by a hand-lever, M³, secured thereto, which is provided with a detent, m³, constructed to engage a notched segment, m², upon the edge of the portion m' of the said plate M'.

In the operation of the machine above described, the corn is first cut by the upper knife at a considerable distance above the ground, both in order to permit the tops to be readily delivered into the machine and to avoid the transportation and storage of the hard butts; and it is obviously immaterial as to the exact height above the ground at which the upper knife operates, it being necessary only that such cutting shall occur below the ears. In the case of the lower knife, however, it is important that it should cut the stubs close to the ground, so that the entire length thereof will rest upon the soil and become rotted. This result is accomplished by the construction above described, the second or lower knife, which is made movable relatively to the machine-frame, as before stated, being permitted to accurately follow the smaller irregularities of the ground independently of the movement of the machine over the larger irregularities thereof, whereby the stalks are severed at a uniform distance above the ground without regard to the vertical movements of the machine, caused by the form of the surface over which the supporting-wheels thereof are passing.

I claim as my invention—

1. The combination, with the frame of a corn-harvester and a stationary knife for cutting the stalks below the ears, of a second vertically-movable knife for severing the standing stubs supported from the machine-frame, and constructed to move vertically independently thereof, substantially as described.

2. The combination, with the frame of a corn-harvester, of a stationary knife for cutting the stalks below the ears, a second knife for severing the standing stubs, and a support for said second knife connected with the machine-frame, and constructed to permit said second knife to move vertically with reference to the said frame, and to sustain it at a uniform distance above the ground, substantially as described.

3. In a corn-harvester, the combination, with the longitudinal frame of the machine, a guide-piece, B, and a knife, D, located between said frame and said guide-piece, of a knife, K, a support, K', for said knife, flexibly connected at its front end to said guide-piece, and constructed to rest upon the ground at its rear end, and a vertical rod, K³, attached to said rear end of the support K', and guided at its upper end in apertures in the guide-piece B, whereby lateral motion in said support is prevented, substantially as described.

4. In a corn-harvester, the combination, with the machine-frame and with the guide-piece B, of a knife, K, a support, K', flexibly attached at its front end to the said guide-piece, and a guide-rod, K³, provided with an adjustable nut, k⁴, for limiting the downward movement of said support, substantially as described.

5. In a corn-harvester, the combination, with the machine-frame and with the guide-piece B, of a knife, K, a support, K', flexibly connected at its front end to said guide-piece, a guide-rod, K³, and a plate, K², attached to said support K', and constructed to afford attachment for said rod and said knife, substantially as described.

6. In a corn-harvester, the combination, with an inner guide-piece, A, and an outer guide-piece, B, of a backwardly-yielding knife having its end extended to a point inside of the outer face of the guide-piece A, substantially as and for the purpose set forth.

7. In a corn-harvester, the combination with a longitudinal frame-piece, A, and an outer guide-piece, B, of a cutter-knife located between said frame and guide-piece, and having a spring-connection with the outer guide-piece, and having its free end extended past the outer face of the frame-piece, substantially as and for the purpose set forth.

8. In a corn-harvester, the combination of a longitudinal frame-piece, A, an outer guide-piece, B, and an upwardly rearward and inwardly inclined knife, D, attached by a spring-connection to the said guide-piece, said frame-piece A being provided with a notch, $a$, to admit the free end of the knife, substantially as described.

9. The combination with a cutting-knife, a receptacle for the cut corn, and means constructed to direct the tops of the cut corn into the receptacle, of a spiral conveyer constructed to deliver the butts of the cut corn into said receptacle, and means for rotating said conveyer, substantially as shown and described.

10. In a corn-harvester, the combination, with a knife, a receptacle for the cut corn, and means for directing the tops of the corn forwardly into the receptacle, of a spiral conveyer arranged diagonally of the machine-frame, with its front end in advance of the knife and in position to engage the butts of the cut corn, and means for rotating said conveyer, substantially as described.

11. In a corn-harvester, the combination, with a longitudinal frame-piece, A, cross-piece C, and knife D, of the conveyer-shaft H', mounted at one of its ends in a bearing, $h'$, supported upon the piece A in advance of the said knife, and at its opposite end in bearings $h^2$ upon the cross-piece C, and means for rotating the said shaft H', substantially as described.

12. In a corn-harvester, the combination, with the machine-frame, a knife, a tilting receptacle for the cut corn, and means for directing the cut corn into the receptacle, of means for temporarily supporting the butts of the cut corn, operated by the movement of said tilting receptacle, substantially as described.

13. The combination, with the machine-frame and a knife for severing the standing corn, of a rearward-tilting platform to receive and discharge the corn-tops, means constructed to deposit the tops on said platform with their butts to the rear, and means for tilting the platform, substantially as described.

14. The combination, with the machine-frame and a knife for severing the standing corn, of a rearward-tilting platform for the reception and discharge of the corn-tops, arranged in advance of the knife, whereby the corn falls forward thereon with its butts to the rear, and means for tilting the platform, substantially as described.

15. The combination, with the machine-frame and a knife for severing the standing corn, of a rearward-tilting platform located with its rear edge in advance of the knife, means to cause the corn-tops to fall forwardly upon said platform, and means for tilting the platform, substantially as described.

16. In a corn-harvester, the combination, with the machine-frame, a knife, a tilting receptacle for the cut corn, and means for delivering the cut corn into the receptacle, of an arm, J, pivoted to a movable part attached to the said tilting receptacle, and constructed to engage a stationary part of the machine-frame, substantially as and for the purpose set forth.

17. In a corn-harvester, the combination, with the machine-frame, of a lever, G, pivoted to the frame, an eye, $j^2$, upon said frame, and an arm, J, pivoted by a universal joint to said lever, and provided with a projecting portion, J', constructed to engage the said eye $j^2$, substantially as described.

18. In a corn-harvester, the combination, with the machine-frame, of a tilting platform, G, a lever G², rigidly secured thereto, and provided with an eye, $j'$, an eye, $j^2$, secured upon a stationary part of the machine-frame, and an arm, J, having an eye, $j$, engaged with the eye $j'$, and an upwardly-extended portion, J', constructed to engage the eye $j^2$, substantially as described.

19. In a corn-harvester, the combination, with the machine-frame, of a hand-lever, G², an eye, $j^2$, attached to a stationary portion of the frame, an arm, J, pivoted to the said hand-lever, and having a projecting portion, J', constructed to engage the said eye $j^2$, and a pin, $j^3$, upon the lever G², for limiting the forward motion of said arm J, substantially as described.

20. In a corn-harvester, the combination, with the knife, and with an upwardly and inwardly inclined guide, B', of a deflector, B², provided with a forwardly-projecting point, B⁶, substantially as and for the purpose set forth.

21. In a corn-harvester, the combination, with the machine-frame, a guide-piece, B, and a knife located between the said frame and guide-piece, of an upwardly and inwardly inclined guide, B', a deflector, B², and standards B³ and cross-piece B⁴, for supporting said guide and deflector, substantially as described.

22. In a corn-harvester, the combination, with the horizontal frame-pieces A and cross-pieces A' and C, of the outer guide-piece, consisting of a horizontally-placed board, B, and side pieces, $b$ and $b'$, substantially as described.

In testimony that I claim the foregoing as my invention I affix my signature in presence of two witnesses.

SAMUEL C. KENAGA.

Witnesses:
CHARLES F. WHITMORE,
FRED. D. PARKER.